United States Patent
Halakatti (10) Patent No.: US 8,902,371 B2
(45) Date of Patent: Dec. 2, 2014

(54) METHOD AND SYSTEM FOR TELEVISION ALIGNMENT

(75) Inventor: Shekhar Halakatti, Carlsbad, CA (US)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 13/214,934

(22) Filed: Aug. 22, 2011

(65) Prior Publication Data

US 2013/0050586 A1    Feb. 28, 2013

(51) Int. Cl.
*H04N 5/66* (2006.01)
*H04N 21/422* (2011.01)
*H04N 21/442* (2011.01)
*H04N 21/485* (2011.01)

(52) U.S. Cl.
CPC ....... *H04N 21/42202* (2013.01); *H04N 21/442* (2013.01); *H04N 21/4854* (2013.01)
USPC ........... 348/739; 348/180; 348/552; 348/190; 348/177; 348/734; 345/158

(58) Field of Classification Search
USPC ......... 348/180, 177, 739, 813, 814, 552, 734, 348/190; 345/158
See application file for complete search history.

(56) References Cited

U.S. PATENT DOCUMENTS

| | | | | |
|---|---|---|---|---|
| 6,964,497 | B2 * | 11/2005 | Greiner | 362/241 |
| 7,952,863 | B1 | 5/2011 | Stifal | |
| 8,433,244 | B2 * | 4/2013 | Liu | 455/41.2 |
| 2008/0124064 | A1 * | 5/2008 | Klinghult et al. | 396/50 |
| 2010/0053467 | A1 | 3/2010 | Maxson | |
| 2012/0007990 | A1 * | 1/2012 | Ansfield | 348/177 |
| 2012/0050161 | A1 * | 3/2012 | Andersson et al. | 345/158 |

FOREIGN PATENT DOCUMENTS

| | | |
|---|---|---|
| JP | 2003018501 | 1/2003 |
| JP | 2004088169 | 3/2004 |
| JP | 2005159426 | 6/2005 |
| JP | 2006013565 | 1/2006 |

\* cited by examiner

*Primary Examiner* — Jefferey Harold
*Assistant Examiner* — Jean W Desir
(74) *Attorney, Agent, or Firm* — John L. Rogitz (57) ABSTRACT

A system and method for television alignment includes: automatically detecting that a television is mounted, wherein the television includes a gyroscope. An orientation of the television is sensed, wherein the gyroscope is operable to perform the sensing. A representation of the orientation is displayed on the television. An acceptable alignment is determined for the television. The acceptable alignment for the television is displayed. There is an indication when the orientation matches the acceptable alignment.

17 Claims, 9 Drawing Sheets

METHOD AND SYSTEM FOR TELEVISION ALIGNMENT

FIELD

Embodiments according to the present invention generally relate to text to televisions, in particular to text to television alignment and control.

BACKGROUND

Flat panel televisions have become popular in both commercial and residential sectors. As the prices for plasma and liquid crystal display (LCD) flat panel televisions continue to fall, the quality of the devices has continued to improve. As a result, the number of businesses and individuals purchasing the flat panel televisions continues to rise.

One appealing element of the flat panel televisions is their relatively low thickness. On the other hand, older tube televisions have a relatively large depth, and the display options for the older tube televisions are limited. For example in the residential setting, users may use a television stand or large entertainment center to store the tube television. Such stands or entertainment centers can take up significant floor space.

Conversely, flat panel televisions are thin and may be mounted directly to a wall or other surface. Various mounting systems have been developed. For example, a flat panel television may hang on a wall like a picture, or hidden brackets may be used behind the flat panel television to secure it to the wall. Sometimes, e.g. in a commercial setting, a number of flat panel televisions may be mounted together in close proximity to display a single image or a number of related images. One or more mounted flat panel televisions may be aligned in order to achieve optimal image display.

SUMMARY

Embodiments of the present invention are directed to a method and system for television alignment. The television alignment system and method uses a gyroscope to help a user align a television. For example, a user may mount the television to a wall. In order to achieve a desired or optimal viewing experience, the user may want to align the television to an acceptable alignment. Therefore, the system and method of television alignment helps the alignment of the television by displaying visual guides. The visual guides graphically represent the alignment of the television, and a user can utilize the guides to align the television.

In one embodiment, method of television alignment includes: detecting an alignment of a television, wherein a gyroscope is operable to perform the detecting; graphically representing the alignment of the television; and in response to changes in the alignment, graphically displaying the changes within a display unit of the television.

In an embodiment, the gyroscope may be integrated into the television or within a remote control device. In some embodiments, the television is operable to perform the graphically representing functionality and the graphically displaying functionality. In various embodiments, the graphically representing and the graphically displaying are presented on the television as at least one of a side view alignment and a front view alignment of the television.

In further embodiments, the detecting an alignment includes detecting a horizontal alignment component, a vertical alignment component, and an angle of tilt component. In other embodiments, in response to the detecting, the method also includes automatically adjusting a backlight of the television. In certain embodiments, in response to the detecting, the method also includes automatically illuminating the television evenly across a display of the television.

In another embodiment, a method includes: automatically detecting that a television is mounted, wherein the television includes a gyroscope; sensing an orientation of the television, wherein the gyroscope is operable to perform the sensing; displaying a representation of the orientation on the television; determining an acceptable alignment for the television; displaying the acceptable alignment for the television; and indicating when the orientation matches the acceptable alignment.

In some embodiments, the automatically detecting includes automatically detecting that the television is mounted to a wall. In various embodiments, the method also includes automatically changing a power state of the television in response to an orientation of a remote control device.

In one embodiment, the determining includes comparing the orientation of the television to an orientation of another television. In further embodiments, the displaying includes displaying orientations of a plurality of televisions. In some embodiments, the determining includes determining acceptable alignments for a number of televisions. In various embodiments, the indicating includes emitting an audible confirmation.

In another embodiment, a system includes: a processor; a display coupled to the processor, an input device coupled to the processor; an audio output device coupled to the processor; and memory coupled to the processor. The memory includes instructions that when executed cause the system to perform a method of alignment. The method of alignment includes: automatically detecting that a television is mounted, wherein the television includes a gyroscope; sensing an orientation of the television, wherein the gyroscope is operable to perform the sensing; displaying a representation of the orientation on the television; determining an acceptable alignment for the television; displaying the acceptable alignment for the television; and indicating when the orientation matches the acceptable alignment.

In some embodiments, the method further includes automatically changing a power state of the television in response to an orientation of a remote control device. In other embodiments, the determining includes comparing the orientation of the television to an orientation of another television. In various embodiments, the displaying includes displaying orientations of a number of televisions. In further embodiments, the determining includes determining acceptable alignments for a number of televisions. In some embodiments, the indicating includes emitting an audible confirmation.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

The drawings showing embodiments of the system are semi-diagrammatic and not to scale and, particularly, some of the dimensions are for the clarity of presentation and are shown exaggerated in the drawing Figures. Also, where multiple embodiments are disclosed and described having some features in common, for clarity and ease of illustration, description, and comprehension thereof, like features one to another will ordinarily be described with like reference numerals.

Some portions (e.g. FIGS. 10-12) of the detailed descriptions, which follow, are presented in terms of procedures, steps, simulations, calculations, logic blocks, processing, and other symbolic representations of operations on data within an electronic system that includes one or more computer systems. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
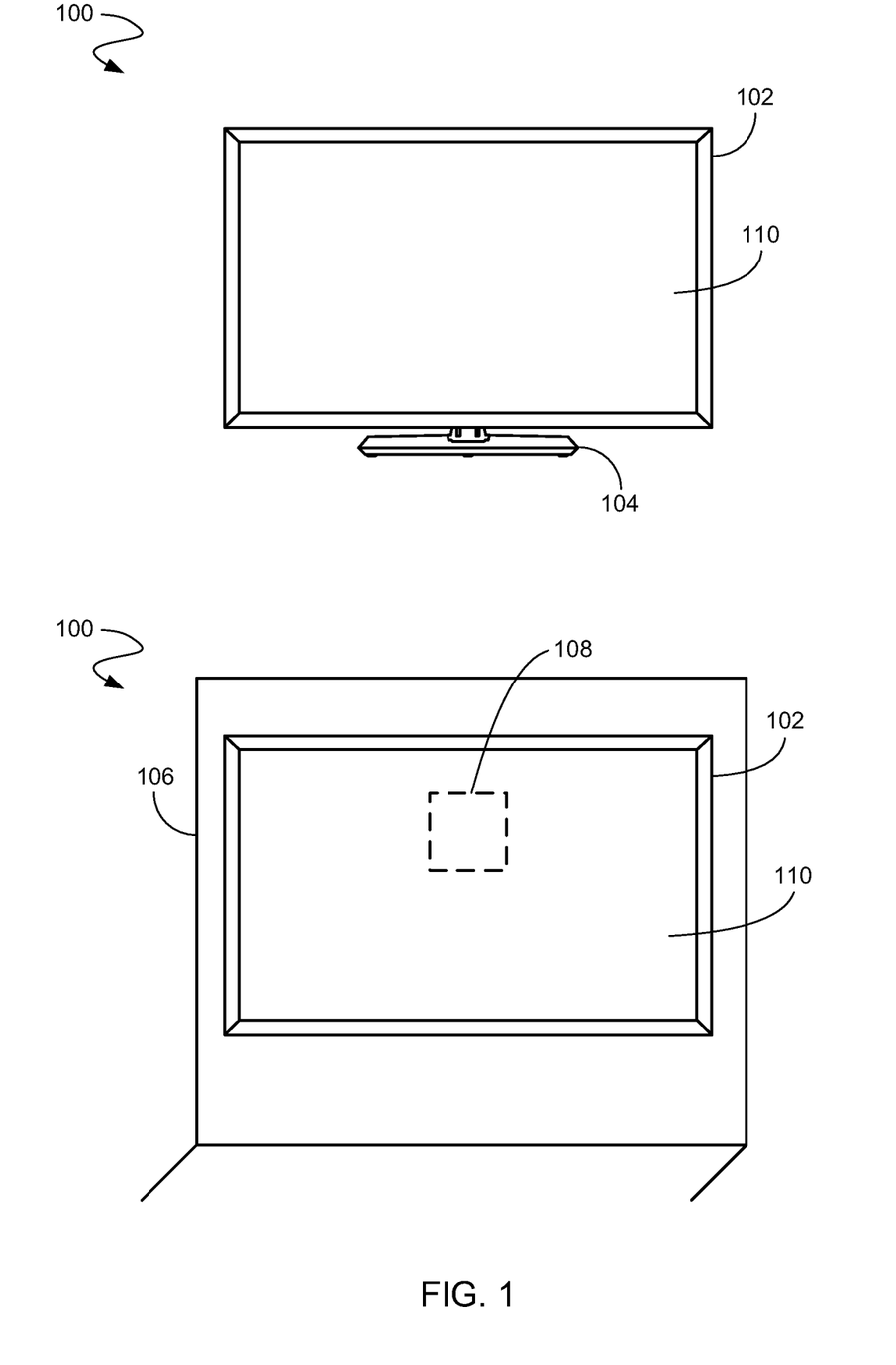
FIG. 1 is a graphical depiction of an exemplary system for television alignment, according to an embodiment of the present invention.

FIG. 1 is a graphical depiction of an exemplary system 100 for television alignment, according to an embodiment of the present invention. The system 100 uses a gyroscope to help a user align a television 102. For example, a user may mount the television 102 to a wall. In order to achieve a desired or optimal viewing experience, the user may want to align the television 102 to an acceptable alignment. Therefore, the system 100 helps the alignment of the television 102 by displaying visual guides. The visual guides graphically represent the alignment of the television 102, and a user can utilize the guides to align the television 102.

In an embodiment, the television 102 may include an optional stand 104. The optional stand 104 may be removed and the television 102 may be hung or mounted, for example on a wall 106. In some embodiments, the television 102 may be mounted to the wall 106 with a mount 108. The television 102 includes a display unit 110, for example a LCD screen, LED screen, a projection screen, an OLED screen, a CRT screen, etc.

Figure 2:
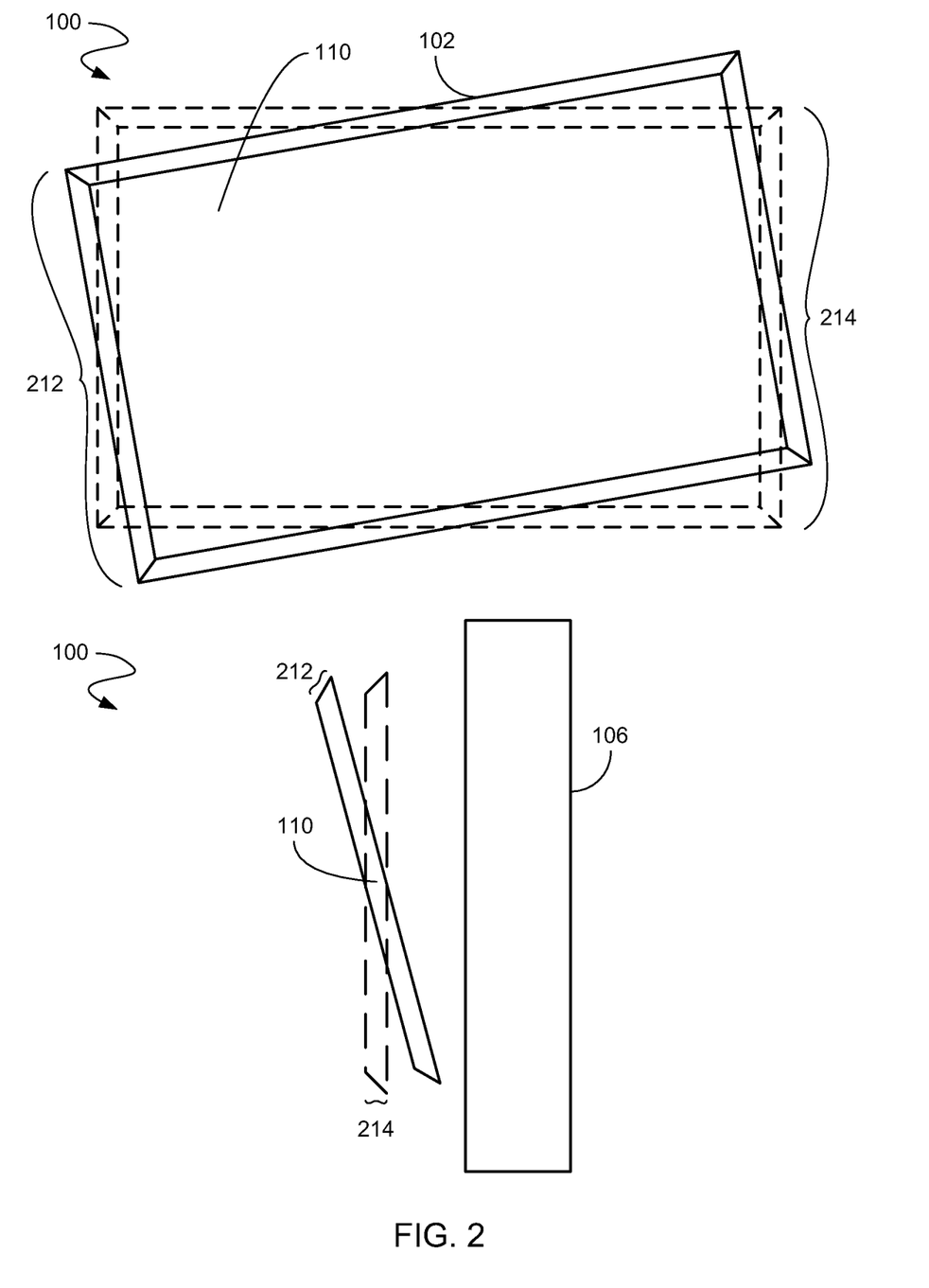
FIG. 2 is a graphical depiction of the exemplary system for television alignment including mounted orientations, according to an embodiment of the present invention.

FIG. 2 is a graphical depiction of the exemplary system 100 for television alignment, according to an embodiment of the present invention. In an embodiment, a user may mount the television 102 to the wall 106. When mounting the television 102, the television 102 may be mounted at an orientation 212 that is not optimal for the user and/or desired by the user.

For example, some alignments of the television 102 may cause images on the display unit 110 to appear undesirably, for example tilted, angled, off center, misaligned, etc. However, by matching the orientation 212 to an acceptable alignment 214, the user may cause images on the display unit 110 to appear desirably.

Figure 3:
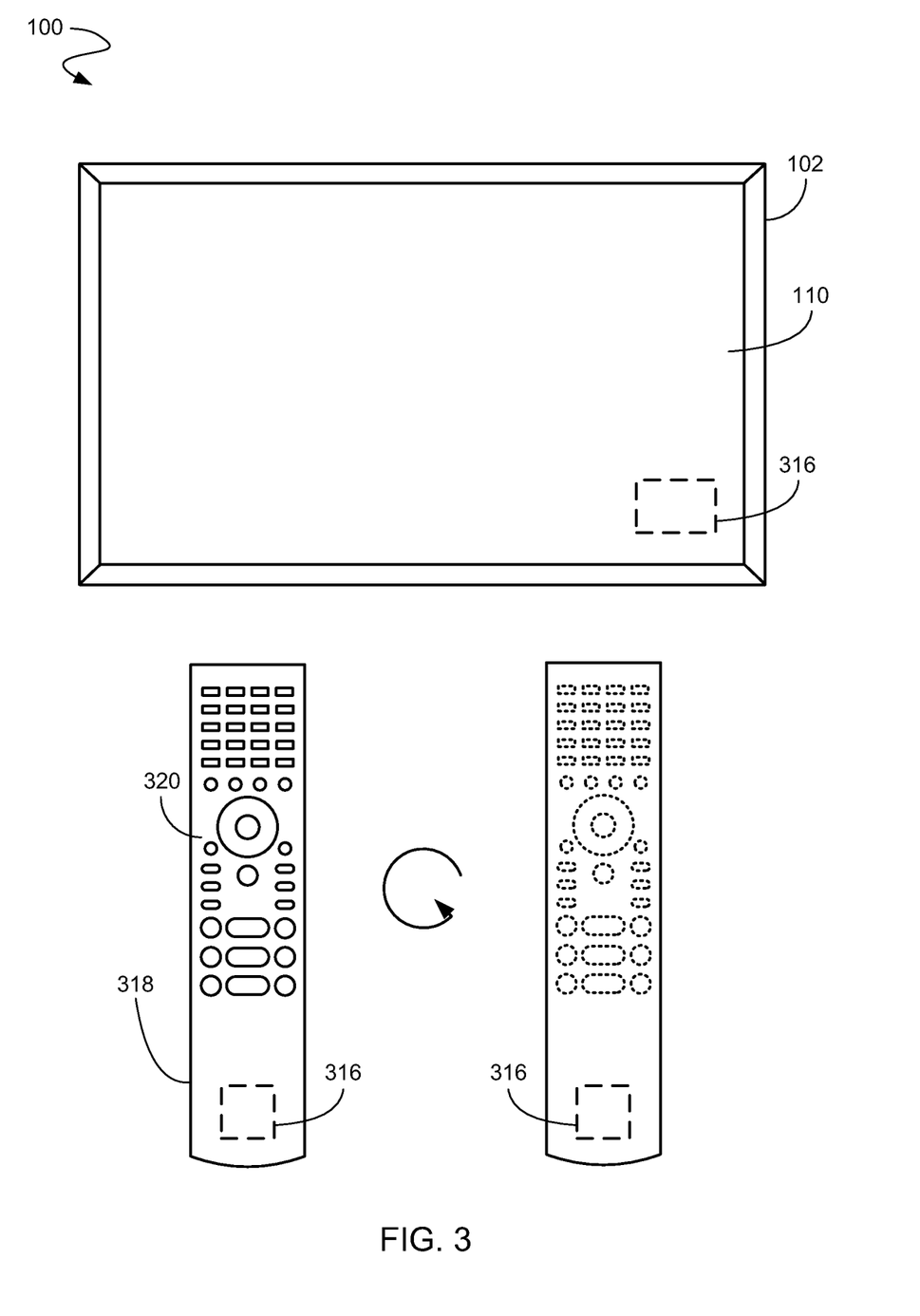
FIG. 3 is a graphical depiction of a gyroscope in the exemplary system for television alignment, according to an embodiment of the present invention.

FIG. 3 is a graphical depiction of a gyroscope 316 in the exemplary system 100 for television alignment, according to an embodiment of the present invention. The gyroscope 316 may be integrated into the television 102. The gyroscope 316 senses the orientation, for example tilt and angle, of the television 102 along three or more axis. In some embodiments, the gyroscope 316 senses the orientation of the television 102 along six or more axes. In various embodiments, one or more components, e.g. chips, within the television 102 may include the gyroscope 316.

In further embodiments, the gyroscope 316 may be integrated into a remote control device 318. The gyroscope 316 may determine the orientation of the television through communication between the remote control device 318, the television 102, and the gyroscope 316. For example, the user may align the remote control device 318 with the television 102. The gyroscope 316 within the remote control device 318 may determine the orientation of the remote control device 318, and communicate that information to the television 102. The television 102 may then use the information from the remote control device 318 to calculate the orientation of the television 102.

In some embodiments, the television 102 may not have the gyroscope 316. However, the remote control device 318 (or any device capable of communicating with the television 102) may include the gyroscope 316. The remote control device 318 may be placed on the television 102 or placed in a mount (not shown) attached to the television 102. The gyroscope 316 within the remote control device 318 determines the orientation of the remote control device 318. The remote control device 318 then communicates the orientation information to the television 102, e.g. through infrared, Bluetooth, etc. The television 102 may then use the position information of the remote control device 318 to calculate the orientation of the television 102.

In various embodiments, gyroscopes 316 may be integrated into both the television 102 and the remote control device 318. The gyroscopes 316 may establish the orientation of the television through communication between the remote control device 318, the television 102, and the gyroscopes 316. For example, the gyroscopes 316 may sense the position of the television 102 and the remote control device 318. The television 102 and the remote control device 318 may then communicate their relative positions to one another to calculate the orientation of the television 102 and/or the remote control device 318.

However, various alignments of the television 102 may cause images to appear unnaturally colored, unevenly illuminated, darker or brighter than preferred, etc. In an embodiment, the television 102 may automatically adjust the backlight of the television 102 based on the orientation detected by the gyroscope 316. For example, the television 102 may automatically detect the tilt of the television 102, and automatically adjust the backlight to nullify the effect of the tilt. Thus, illumination will be even across the television screen, creating a virtual eye line sight effect, even if the television 102 is positioned above or below the eye line.

In an embodiment, the gyroscope 316 in the remote control device 318 may be used to change a power state of the television 102. For example, the remote control device 318 may be oriented with a faceplate 320 facing up, e.g. facing the user. The gyroscope 316 may detect the up orientation and communicate that information to the remote control device 318 and/or the television 102. In response to the communication of the up orientation, the television 102 may change to an on power state. Furthermore, the gyroscope 316 may detect when the faceplate 320 is facing down, e.g. facing away from the user. The gyroscope 316 may then communicate that information to the remote control device 318 and/or the television 102. In response to the communication of the down orientation, the television 102 may change to an off power state. In further embodiments, various orientations of the remote control device 318 may be used to change the television 102 to various power states, e.g. on, off, sleep, etc.

Figure 4:
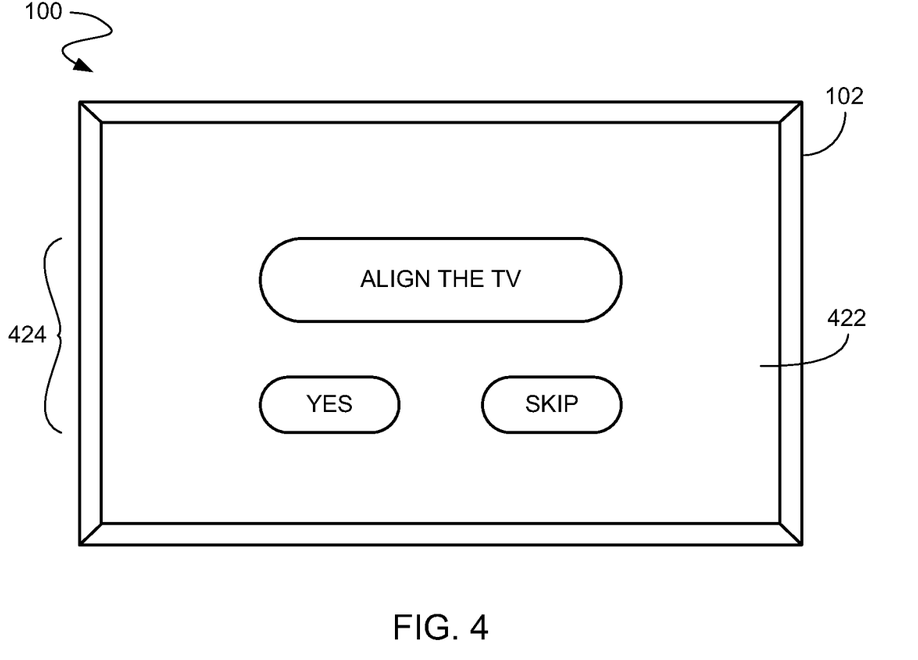
FIG. 4 is a graphical depiction of an alignment graphical user interface for the exemplary system for television alignment, according to an embodiment of the present invention.

FIG. 4 is a graphical depiction of a computer controlled alignment GUI ("Graphical User Interface") 422 for the exemplary system 100 for television alignment, according to an embodiment of the present invention. The television 102 may detect that it has been powered on for the first time and/or that it is mounted, for example to a wall. In response, the television displays the alignment GUI 422. In some embodiments, the user may force the television 102 to display the alignment GUI 422, for example through menu selection and/or setup controls. In various embodiments, the alignment GUI 422 may display one or more confirmation prompts 424, asking the user to confirm that the user wishes to align the television 102.

Figure 5:
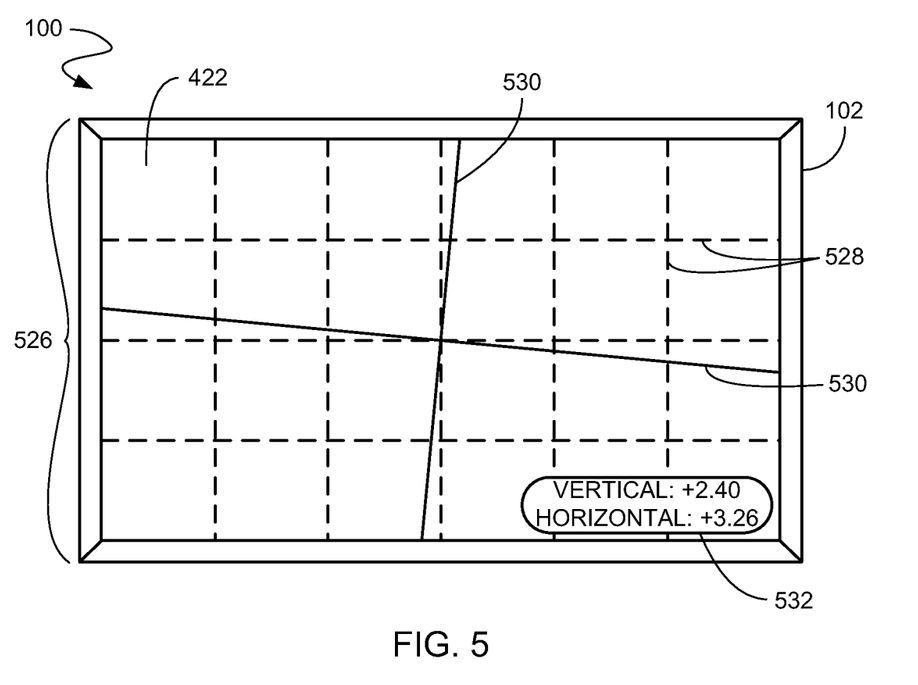
FIG. 5 is a graphical depiction of the alignment graphical user interface rendering a first alignment screen, according to an embodiment of the present invention.

FIG. 5 is a graphical depiction of the alignment GUI 422 rendering a first alignment screen 526, according to an embodiment of the present invention. A user may use first alignment screen 526 to horizontally and vertically orient the television 102. The alignment GUI 422 is automatically updated in real time as the television 102 is moved or otherwise displaced.

In an embodiment, the first alignment screen 526 may display a target grid 528. The target grid 528 represents an acceptable alignment for the television 102. In addition, the first alignment screen 526 may display first orientation guides 530, e.g. horizontal line components and vertical line components. The first orientation guides 530 graphically represent the current orientation of the television 102. The target grid 528 and/or the first orientation guides 530 may use any coordinate system, e.g. degree coordinate, minute coordinate, Cartesian coordinate, circular coordinate, etc.

In further embodiments, the first alignment screen 526 may display a first coordinate window 532. The first coordinate window 532 displays a numerical value (e.g. degree, minute, Cartesian coordinate, circular coordinate, etc.) for the current orientation of the television 102.

Figure 6:
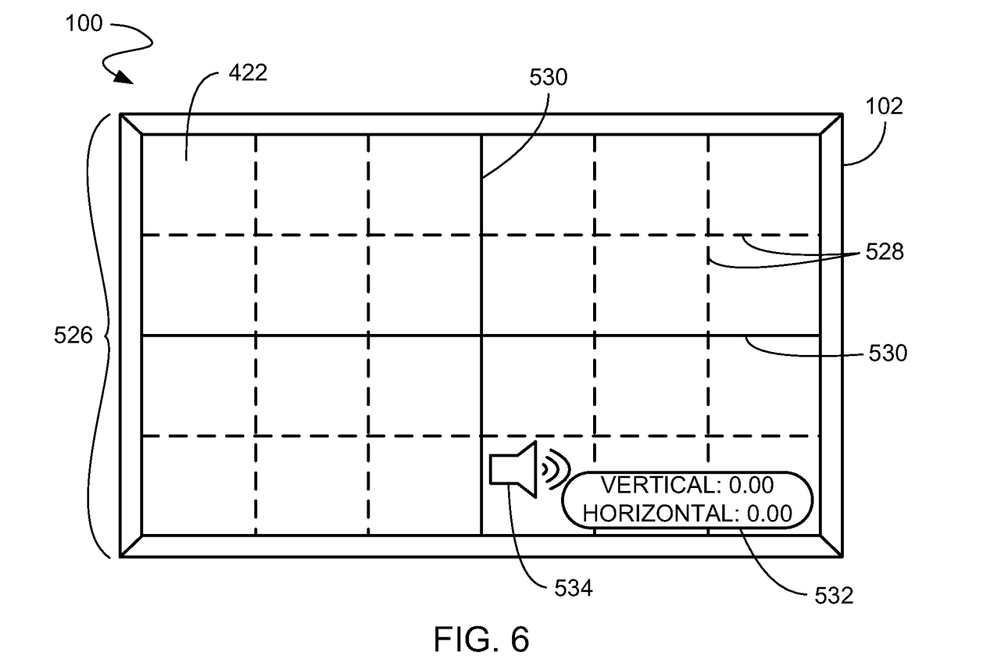
FIG. 6 is a graphical depiction of the first alignment screen showing that the first orientation guides are in alignment with the target grid, according to an embodiment of the present invention.

FIG. 6 is a graphical depiction of the first alignment screen 526 showing that the first orientation guides 530 are in alignment with the target grid 528, according to an embodiment of the present invention. A user may adjust the orientation of the television 102 to the acceptable alignment. In an embodiment, the user may confirm the alignment when the first orientation guides 530 are aligned with the target grid 528. In some embodiments, the user may also confirm the alignment with the first coordinate window 532, e.g. the coordinates read zero. In further embodiments, the television 102 may emit an audible confirmation 534, e.g. a beep, when the orientation of the television 102 matches the acceptable alignment, or a display attribute may be rendered.

Figure 7:
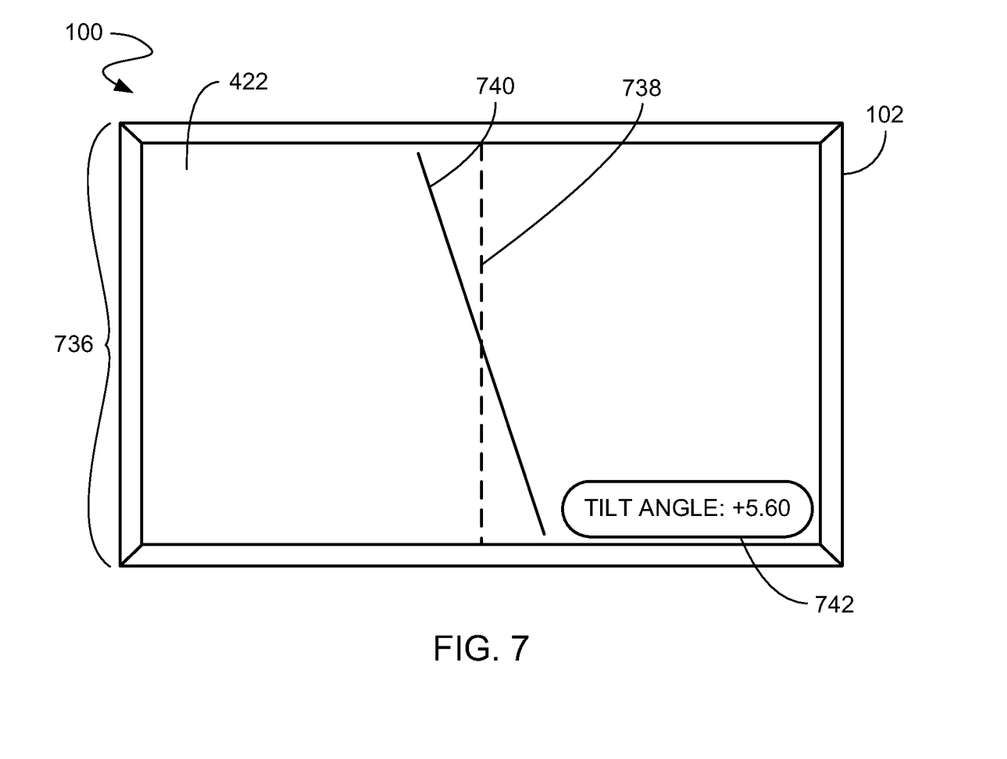
FIG. 7 is a graphical depiction of the alignment graphical user interface rendering a second alignment screen, according to an embodiment of the present invention.

FIG. 7 is a graphical depiction of the alignment GUI 422 rendering a second alignment screen 736, according to an embodiment of the present invention. A user may use second alignment screen 736 to adjust the tilt angle of the television 102.

In an embodiment, the second alignment screen 736 may display a target orientation 738. The target orientation 738 represents an acceptable alignment for the television 102. In addition, the second alignment screen 736 may display a second orientation guide 740. The second orientation guide 740 graphically represents the current orientation of the television 102. The target orientation 738 and/or the second orientation guide 740 may use any coordinate system, e.g. degree coordinate, minute coordinate, Cartesian coordinate, circular coordinate, etc.

In further embodiments, the second alignment screen 736 may display a second coordinate window 742. The second coordinate window 742 displays a numerical value (e.g.

degree, minute, Cartesian coordinate, circular coordinate, etc.) for the current orientation of the television 102.

Figure 8:
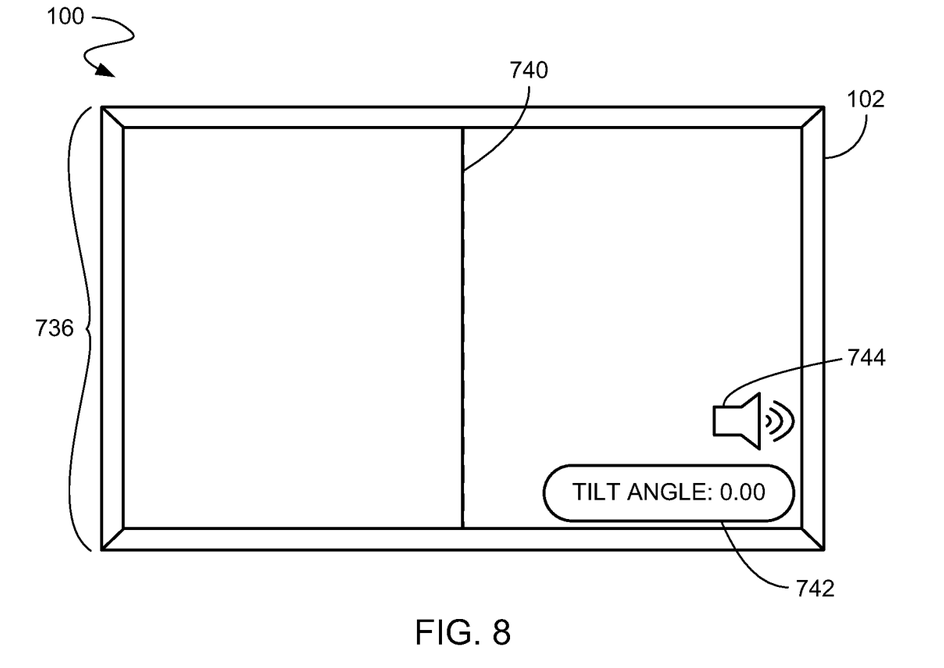
FIG. 8 is a graphical depiction of the second alignment screen showing that the second orientation guide is in alignment with the target orientation, according to an embodiment of the present invention.

FIG. 8 is a graphical depiction of the second alignment screen 736 showing that the second orientation guide 740 is in alignment with the target orientation 738 (FIG. 7), according to an embodiment of the present invention. A user may adjust the orientation of the television 102 to the acceptable alignment. In an embodiment, the user may confirm the alignment when the second orientation guide 740 is aligned with the target orientation 738 (FIG. 7). In some embodiments, the user may also confirm the alignment with the second coordinate window 742, e.g. the coordinates read zero. In further embodiments, the television 102 may emit an audible confirmation 744, e.g. a beep, when the orientation of the television 102 matches the acceptable alignment.

Figure 9:
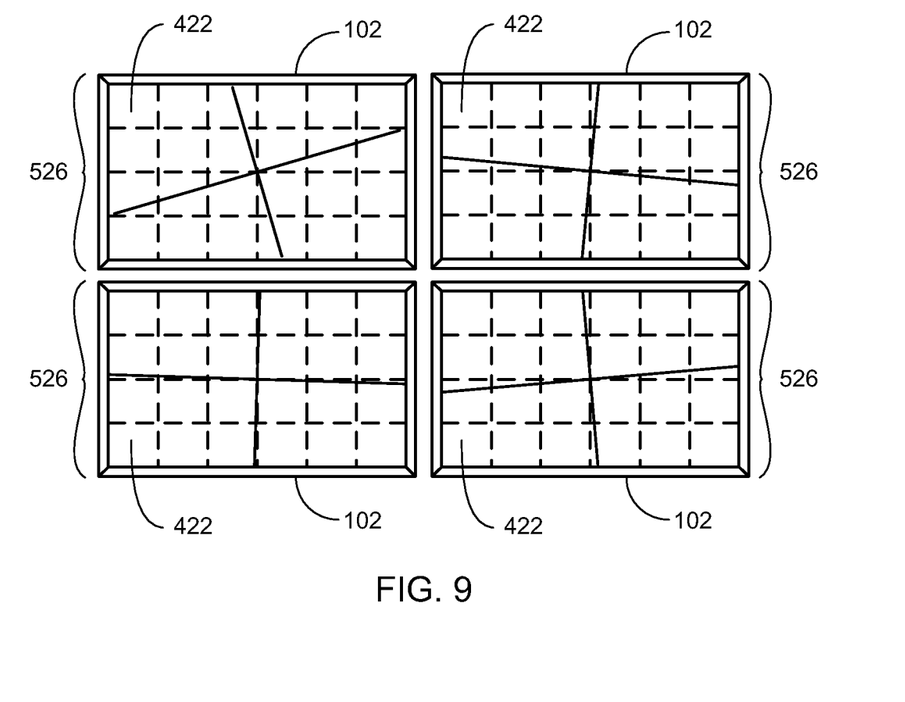
FIG. 9 is a graphical depiction of a number of the alignment graphical user interfaces rendering the first alignment screens on a number of televisions, according to an embodiment of the present invention.

FIG. 9 is a graphical depiction of a number of the alignment GUIs 422 rendering the first alignment screens 526 on a number of televisions 102, according to an embodiment of the present invention. A user may wish to orient a number of the televisions 102 with respect to each other and/or a user. In some embodiments, the user would align each of the televisions 102 as described above. In further embodiments, the number of alignment GUIs 422 may be rendered on one television (not shown).

In various embodiments, the acceptable alignment calculated for each of the televisions 102 may also include alignment information shared between the televisions 102. For example, the televisions 102 may communicate alignment information to each other. The televisions 102 may then use the alignment information to calculate acceptable alignments for each of the televisions 102. A user may then align the televisions as described above.

Figure 10:
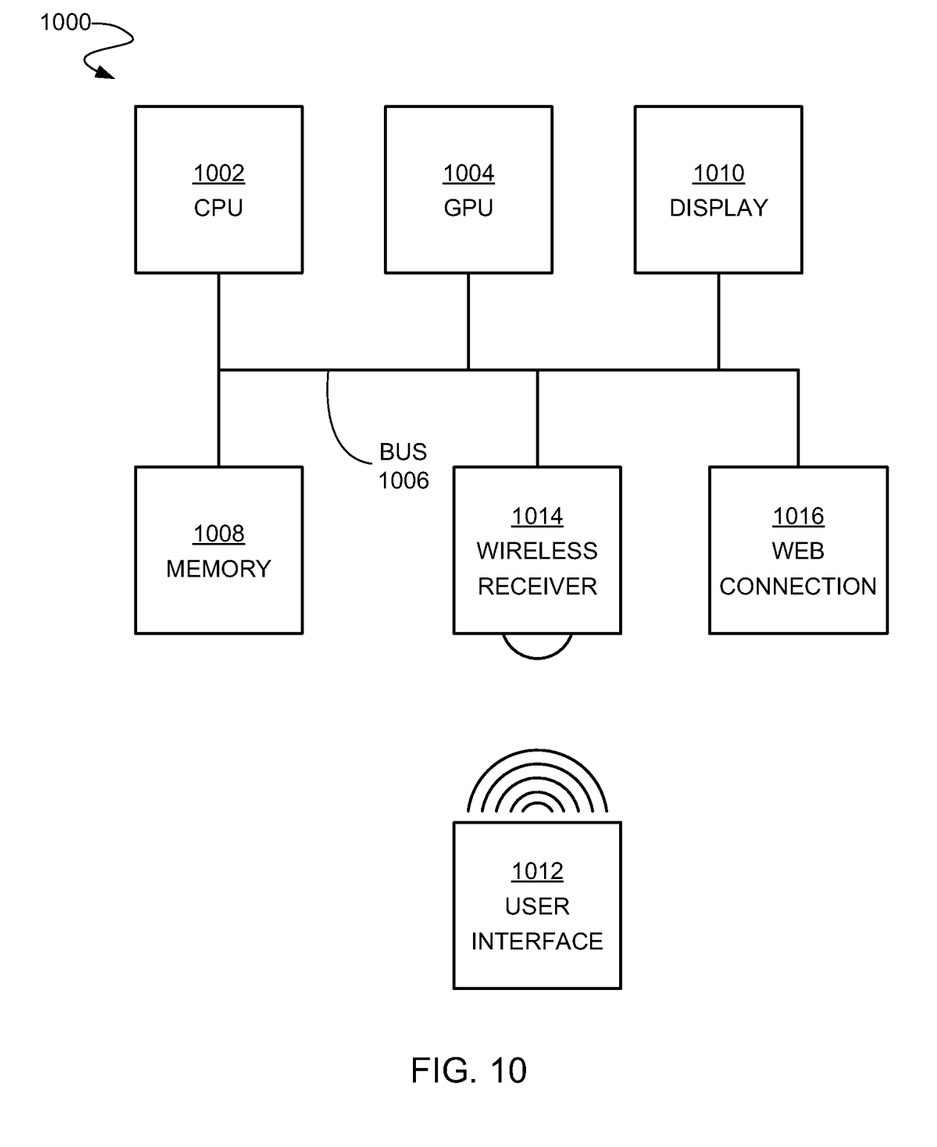
FIG. 10 is a block diagram of an example of a general purpose television system within which a system of television alignment in accordance with the present invention can be implemented.

FIG. 10 is a block diagram of an example of a general purpose television system 1000 within which a system of television alignment in accordance with the present invention can be implemented. In the example of FIG. 10, the system includes a host central processing unit (CPU) 1002 coupled to a graphics processing unit (GPU) 1004 and a web connection 1016 via a bus 1006. One or more CPUs as well as one or more GPUs may be used. The web connection 1016 may be, for example, an Ethernet port, a cable modem, a DSL modem, etc.

Both the CPU 1002 and the GPU 1004 are coupled to memory 1008. In the example of FIG. 10, the memory 1008 may be a shared memory, whereby the memory stores instructions and data for both the CPU 1002 and the GPU 1004. Alternatively, there may be separate memories dedicated to the CPU 1002 and GPU 1004, respectively. In an embodiment, the memory 1008 includes the system of displaying information of specific interest to a user in accordance with the present invention. The memory 1008 can also include a video frame buffer for storing pixel data that drives a coupled display device 1010.

The system 1000 also includes a user interface 1012 that may include an I/R remote control device, a LAN remote control device, or an application on a smart phone. The user interface 1012 may be a wired interface (not shown) or a wireless interface communicating to a wireless receiver 1014.

Generally speaking, the system 1000 includes the basic components of a television system platform that implements functionality in accordance with embodiments of the present invention. The system 1000 can be implemented as, for example, any of a number of different types of television systems (e.g., LED, Plasma, LCD, OLED, and CRT).

Figure 11:
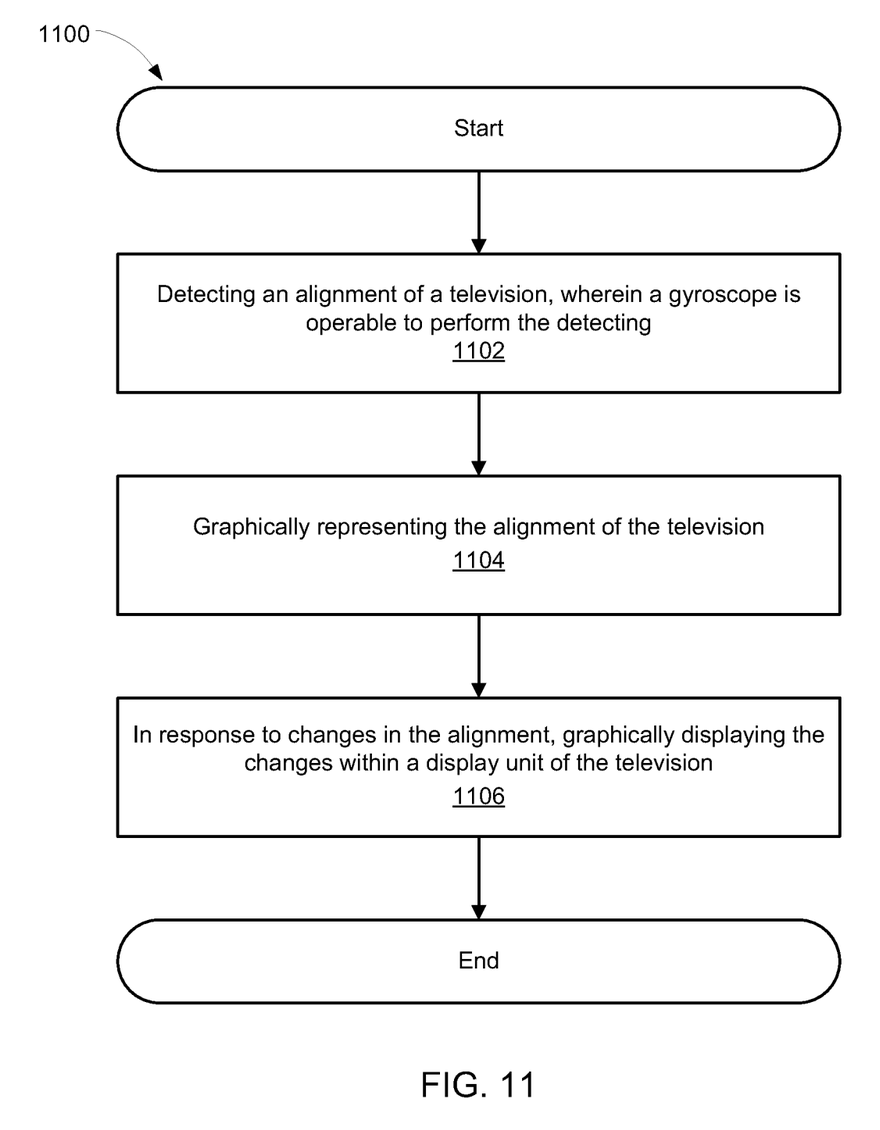
FIG. 11 depicts a flowchart of an exemplary method of television alignment, according to an embodiment of the present invention.

FIG. 11 depicts a flowchart 1100 of an exemplary method of television alignment, according to an embodiment of the present invention. Although specific steps are disclosed in the flowchart 1100, such steps are exemplary. That is, embodiments of the present invention are well-suited to performing various other steps or variations of the steps recited in the flowchart 1100.

In a step 1102, an alignment of a television is detected in real time, wherein a gyroscope is operable to perform the detecting. For example, in FIGS. 1-3 the gyroscope detects the real time orientation of the television, for example tilt and angle, along three or more axis. In some embodiments, the gyroscope is integrated into the television or the remote control. For example, in FIG. 3 the gyroscope may be integrated into the television, the remote control device, or both the television and the remote control device.

In various embodiments, the detecting the alignment of the television includes detecting a horizontal alignment component, a vertical alignment component, and an angle of tilt component. For example, in FIG. 5 the first alignment screen displays the horizontal line components and the vertical line components that have been detected by the gyroscope. In FIG. 7 the second alignment screen displays the angle of tilt of the television that has been detected by the gyroscope.

In further embodiments, in response to the detecting the alignment, the backlight of the television is automatically adjusted. For example, in FIG. 3 the television automatically detects the tilt of the television, and automatically adjusts the backlight. The automatic backlight adjustment creates even illumination across the screen, even if the television is positioned above or below the eye line, thus creating a virtual eye line sight effect.

In a step 1104, the real time alignment of the television is graphically represented and updated in real time. For example, in FIGS. 5-9 the first orientation guides and the second orientation guide graphically represent the instant orientation of the television. In some embodiments the television is operable to perform the graphically representing. For example, in FIGS. 5-9 the television displays the orientation guides in the GUI.

In various embodiments, the graphically representing is presented on the television as at least one of a side view alignment and a front view alignment of the television. For example, in FIG. 5 and FIG. 7 the GUI displayed on the television renders a first alignment screen and a second alignment screen. The first alignment screen is the front view alignment for the television. The second alignment screen is the side view alignment for the television.

In a step 1106, in response to changes in the alignment, the changes are graphically displayed within a display unit of the television. For example, in FIGS. 5-8 the alignment screens are rendered on the display unit of the television. The alignment screens display orientation guides that represent the instant orientation of the television. As a user changes the orientation of the television, the orientation guides graphically update and display the changes to the orientation of the television in real time.

In an embodiment, the television is operable to perform the graphically displaying. For example, in FIGS. 5-9 the television displays the orientation guides in the GUI. In various embodiments, the graphically displaying is presented on the television as at least one of a side view alignment and a front view alignment of the television. For example, in FIG. 5 and FIG. 7 the GUI displayed on the television renders a first alignment screen and a second alignment screen. The first alignment screen is the front view alignment for the television. The second alignment screen is the side view alignment for the television.

Figure 12:
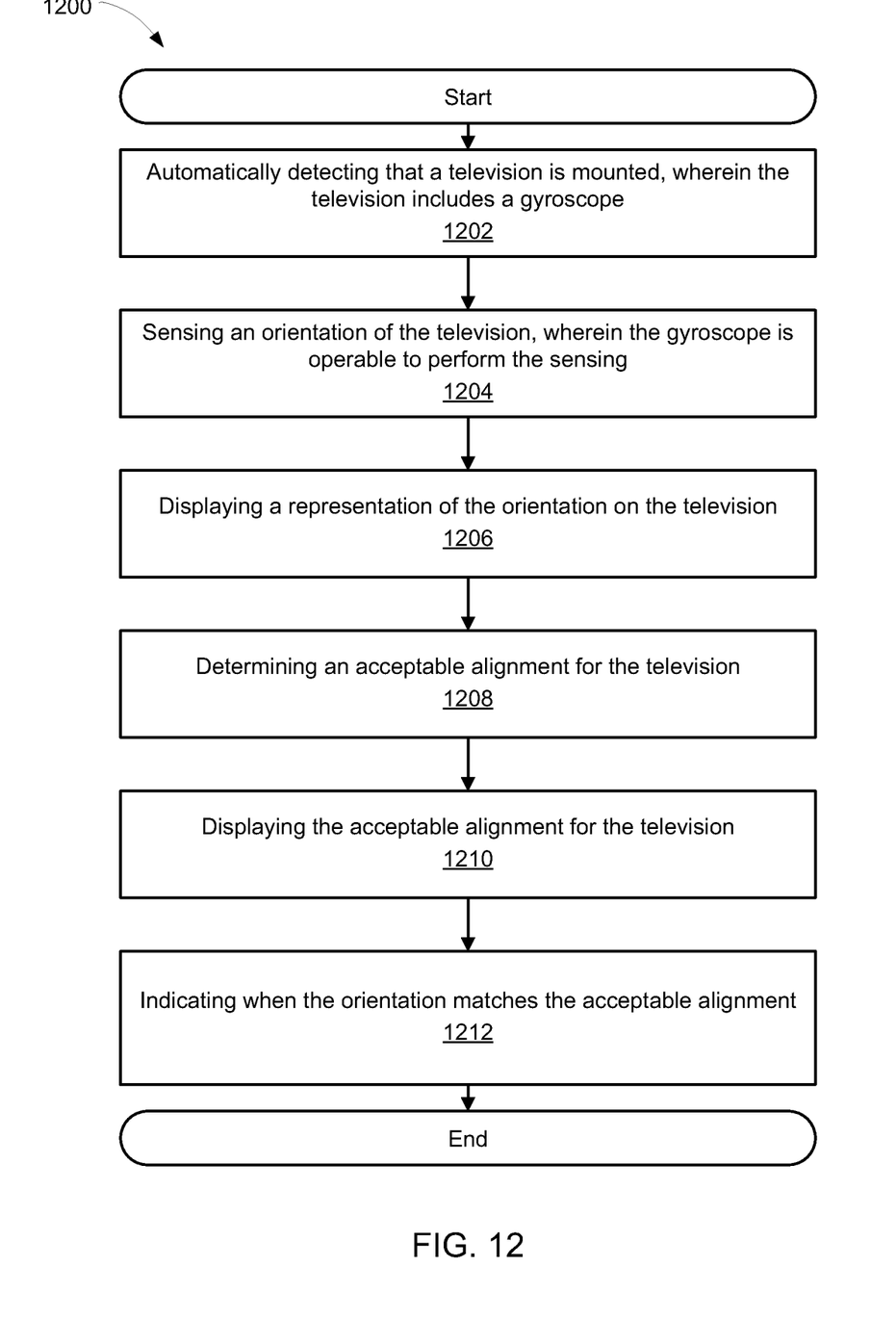
FIG. 12 depicts a flowchart of another exemplary method of television alignment, according to an embodiment of the present invention.

FIG. 12 depicts a flowchart 1200 of an exemplary method of television alignment, according to an embodiment of the present invention. Although specific steps are disclosed in the flowchart 1200, such steps are exemplary. That is, embodiments of the present invention are well-suited to performing various other steps or variations of the steps recited in the flowchart 1200.

In a step 1202, automatically detecting that a television is mounted, wherein the television includes a gyroscope. For example, in FIG. 4 the television may detect that it is mounted to, as illustrated in FIG. 1. In FIG. 3, the television and/or the remote control device includes the gyroscope. In some embodiments, the automatically detecting may include automatically detecting that the television is mounted to a wall, as illustrated in FIG. 1.

In a step 1204, sensing an orientation of the television, wherein the gyroscope is operable to perform the sensing. For example, in FIGS. 1-3 the gyroscope senses the orientation of the television, for example tilt and angle, along three or more axis. In some embodiments, the gyroscope is integrated into the television or the remote control. For example, in FIG. 3 the gyroscope may be integrated into the television, the remote control device, or both the television and the remote control device.

In a step 1206, a representation of the orientation is displayed on the television. For example, in FIGS. 5-9 the first orientation guides and the second orientation guide graphically represent the instant orientation of the television. In some embodiments, the displaying includes displaying orientations of a number of televisions. For example, in FIG. 9 a number of alignment GUIs may display alignment screens for a number of televisions on one or more televisions.

In a step 1208, an acceptable alignment for the television is determined. For example, in FIG. 2 and FIG. 3 the television may use information from the gyroscope(s) to automatically calculate an orientation of the television that will cause images on the display unit to appear desirably, thus preventing images from being tilted, angled, off center, misaligned, etc.

In some embodiments, the determining includes comparing the orientation of the television to an orientation of another television. For example, in FIG. 9 the televisions communicate alignment information to one another. In further embodiments, the determining includes determining acceptable alignments for a number of televisions. For example in FIG. 9, the televisions use the alignment information to calculate alignments for each of the televisions.

In a step 1210, an acceptable alignment for the television is displayed. For example, in FIGS. 5-9 the first orientation guides and the second orientation guide graphically represent the instant orientation of the television. In some embodiments the television is operable to perform the graphically representing. For example, in FIGS. 5-9 the television displays the orientation guides in the GUI.

In a step 1212, indicating when the orientation matches the acceptable alignment. For example, in FIG. 6 and FIG. 8 matching the positions of the orientation guides, the target grid, and target orientation indicates to the user that the orientation of the television is acceptable. In some embodiments, the indicating includes emitting an audible confirmation. For example, in FIG. 6 and FIG. 8 the television may emit an audible noise, for example a beep, when the orientation of the television matches the acceptable alignment, or a display attribute may be rendered.

In further embodiments, the power state of the television may automatically change in response to an orientation of a remote control device. For example, in FIG. 3 the gyroscope may detect the up orientation and communicate that information to the remote control device and/or the television. In response to the communication of the up orientation, the television may change to an on power state. Furthermore, the gyroscope may detect when the faceplate is facing down, e.g. facing away from the user. The gyroscope may then communicate that information to the remote control device and/or the television. In response to the communication of the down orientation, the television may change to an off power state.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of video display alignment, said method comprising:
    detecting an alignment of a video display in real time using a gyroscope;
    graphically representing said alignment of said video display in real time; and
    in response to changes in said alignment, graphically displaying said changes on the video display, wherein said gyroscope is integrated into a remote control device.

2. The method of claim 1 wherein said video display is operable to perform said graphically representing and said graphically displaying.

3. The method of claim 1 wherein said graphically representing and said graphically displaying are presented on said video display as at least one of a side view alignment or a front view alignment of said video display.

4. The method of claim 1 wherein said detecting an alignment, comprises detecting a horizontal alignment component, a vertical alignment component, and an angle of tilt component.

5. A method of video display alignment, said method comprising:
    detecting an alignment of a video display in real time using a gyroscope;
    graphically representing said alignment of said video display in real time;
    in response to changes in said alignment, graphically displaying said changes on the video display; and
    in response to said detecting, automatically adjusting a backlight of said video display.

6. The method of claim 1 further comprising, in response to said detecting, automatically illuminating said video display evenly across a display of said video display.

7. A method comprising:
    using a gyroscope, sensing an orientation of a video display;
    displaying a representation of said orientation on said video display;
    determining an acceptable alignment for said video display;
    displaying said acceptable alignment for said video display; and
    indicating when said orientation matches said acceptable alignment wherein said determining comprises comparing said orientation of said video display to an orientation of another video display.

8. The method of claim 7 comprising automatically detecting that said video display is mounted to a wall.

9. The method of claim 7 further comprising automatically changing a power state of said video display in response to an orientation of a remote control device.

10. The method of claim 7 wherein said indicating comprises emitting an audible confirmation.

11. A method comprising:
- using a gyroscope, sensing an orientation of a video display;
- displaying a representation of said orientation on said video display;
- determining an acceptable alignment for said video display;
- displaying said acceptable alignment for said video display; and
- indicating when said orientation matches said acceptable alignment wherein said displaying comprises displaying orientations of a plurality of video displays.

12. A method comprising:
- using a gyroscope, sensing an orientation of a video display;
- displaying a representation of said orientation on said video display;
- determining an acceptable alignment for said video display;
- displaying said acceptable alignment for said video display; and
- indicating when said orientation matches said acceptable alignment wherein said determining comprises determining acceptable alignments for a plurality of video displays.

13. A system comprising:
- a processor;
- a display coupled to said processor;
- memory coupled to said processor, wherein said memory comprises instructions that when executed cause said system to perform a method of alignment, said method comprising:
  - sensing an orientation of the display using a gyroscope;
  - displaying a representation of said orientation on said display;
  - determining an acceptable alignment for said display;
  - displaying said acceptable alignment for said display; and
  - indicating when said orientation matches said acceptable alignment wherein said displaying comprises displaying orientations of a plurality of displays.

14. The system of claim 13 wherein said method further comprises automatically changing a power state of said display in response to an orientation of a remote control device.

15. The system of claim 13 wherein said indicating comprises emitting an audible confirmation.

16. A system comprising:
- a processor;
- a display coupled to said processor;
- memory coupled to said processor, wherein said memory comprises instructions that when executed cause said system to perform a method of alignment, said method comprising:
- sensing an orientation of the display using a gyroscope;
- displaying a representation of said orientation on said display;
- determining an acceptable alignment for said display;
- displaying said acceptable alignment for said display; and
- indicating when said orientation matches said acceptable alignment wherein said determining comprises comparing said orientation of said display to an orientation of another display.

17. A system comprising:
- a processor;
- a display coupled to said processor;
- memory coupled to said processor, wherein said memory comprises instructions that when executed cause said system to perform a method of alignment, said method comprising:
- sensing an orientation of the display using a gyroscope;
- displaying a representation of said orientation on said display;
- determining an acceptable alignment for said display;
- displaying said acceptable alignment for said display; and
- indicating when said orientation matches said acceptable alignment wherein said determining comprises determining acceptable alignments for a plurality of displays.

* * * * *